United States Patent
Onishi et al.

(10) Patent No.: US 10,750,767 B2
(45) Date of Patent: Aug. 25, 2020

(54) NON-FRIED POTATO CHIPS

(71) Applicant: NISSIN FOODS HOLDINGS CO., LTD., Osaka (JP)

(72) Inventors: Atsushi Onishi, Tokyo (JP); Yoshifumi Miyazaki, Tokyo (JP); Mitsuru Tanaka, Tokyo (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 246 days.

(21) Appl. No.: 14/387,341

(22) PCT Filed: Mar. 13, 2013

(86) PCT No.: PCT/JP2013/001658
§ 371 (c)(1),
(2) Date: Sep. 23, 2014

(87) PCT Pub. No.: WO2013/145601
PCT Pub. Date: Oct. 3, 2013

(65) Prior Publication Data
US 2015/0079267 A1 Mar. 19, 2015

(30) Foreign Application Priority Data

Mar. 29, 2012 (JP) ................................. 2012-077619

(51) Int. Cl.
*A23L 19/18* (2016.01)
(52) U.S. Cl.
CPC ........... *A23L 19/18* (2016.08); *A23V 2002/00* (2013.01)
(58) Field of Classification Search
None
See application file for complete search history.

(56) References Cited

U.S. PATENT DOCUMENTS 4,756,916 A * 7/1988 Dreher .................... A23L 1/217
426/302
6,149,959 A * 11/2000 Dayley ................ A23L 1/2163
426/438

(Continued)

FOREIGN PATENT DOCUMENTS

| JP | 56-39760 | 4/1981 |
| JP | 6-508518 | 9/1994 |

(Continued)

OTHER PUBLICATIONS

Pronyk: Superheated Steam: Its Not Just About Drying; Paper No. 05-009; Written for presentation at the CSAE/SCGR 2005 Meeting Winnipeg, Manitoba on Jun. 26-29, 2005. (Year: 2005).*

(Continued)

*Primary Examiner* — Patricia A George
(74) *Attorney, Agent, or Firm* — Greenblum & Bernstein, P.L.C.

(57) ABSTRACT

Disclosed herein are non-fried potato chips that are produced without frying in oil to reduce an oil content but have a crispy texture and good meltability in the mouth, which cannot be sufficiently achieved by conventional non-fried potato chips, and are therefore comparable to potato chips produced by frying in oil. The inside of the non-fried potato chips is sufficiently puffed, and the non-fried potato chips have a number of pores. More specifically, the non-fried potato chips have 10/mm$^2$ or more holes with a short diameter of 20 µm or more and a porosity of 35% to 65% when their vertical sections are observed.

5 Claims, 8 Drawing Sheets

(56) References Cited

U.S. PATENT DOCUMENTS

| | | | |
|---|---|---|---|
| 6,893,673 B2 * | 5/2005 | Hander ................. | A21D 13/04 426/438 |
| 7,867,535 B2 | 1/2011 | Anand et al. | |
| 2006/0204638 A1 | 9/2006 | Chen et al. | |
| 2008/0026118 A1 | 1/2008 | Bows et al. | |
| 2008/0026122 A1 | 1/2008 | Bows et al. | |
| 2008/0138480 A1 | 6/2008 | Bows et al. | |
| 2010/0266734 A1 | 10/2010 | Bows et al. | |
| 2011/0064854 A1 | 3/2011 | Bows et al. | |
| 2011/0256277 A1 | 10/2011 | Bows et al. | |

FOREIGN PATENT DOCUMENTS

| | | |
|---|---|---|
| JP | 2000-508887 | 7/2000 |
| JP | 2001-510686 | 8/2001 |
| JP | 2005-245389 | 9/2005 |
| JP | 2006-191871 | 7/2006 |
| JP | 3160399 | 6/2010 |
| WO | 92/21250 | 12/1992 |
| WO | 97/36502 | 10/1997 |
| WO | 99/04650 | 2/1999 |

OTHER PUBLICATIONS

Segnini: Volume Measurement Method of Potato Chips; 2004 Volume International Journal of Food Properties, 7:1, 37-44, DOI: 10.1081/JFP-120022494. (Year: 2004).*

Garmakhany: Study of oil uptake and some quality attributes of potato chips affected by hydrocolloids; Eur. J. Lipid Sci. Technol. 2008, 110, 1045-1049. (Year: 2008).*

Loebenstein: The sweet potato; Springer Science & Business Media, Mar. 21, 2009—Technology & Engineering—522 pages. (Year: 2009).*

Search report from International Bureau of WIPO in PCT/JP2013/001658, dated Jun. 4, 2013.

Pimpaporn et al., "Effects of combined pretreatments on drying kinetics and quality of potato chips undergoing low-pressure superheated steam drying", Journal of food engineering, vol. 81, 2007, pp. 318-329.

Carla V Yagua et al, "Physical and Thermal Properties of potato chips vacuum frying", Journal of food engineering, vol. 104, 2011, pp. 272-283.

European search report issued with respect to application No. 13767748.0, dated Dec. 1, 2015.

* cited by examiner

[Fig. 1]
ELECTRON MICROGRAPH OF VERTICAL SECTION OF EXAMPLE 1
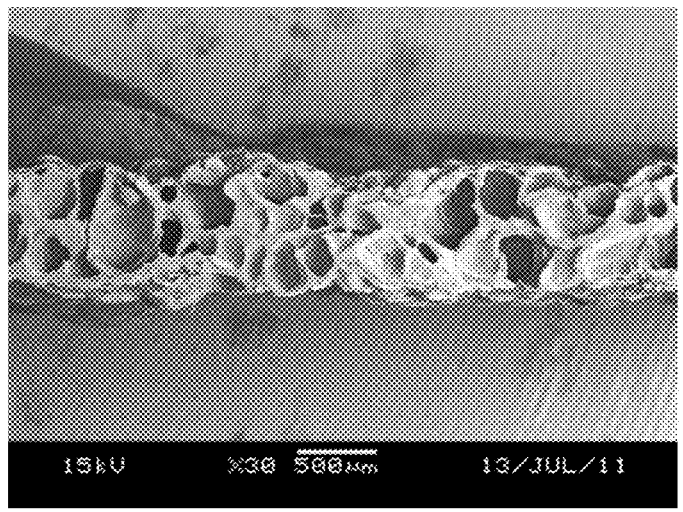
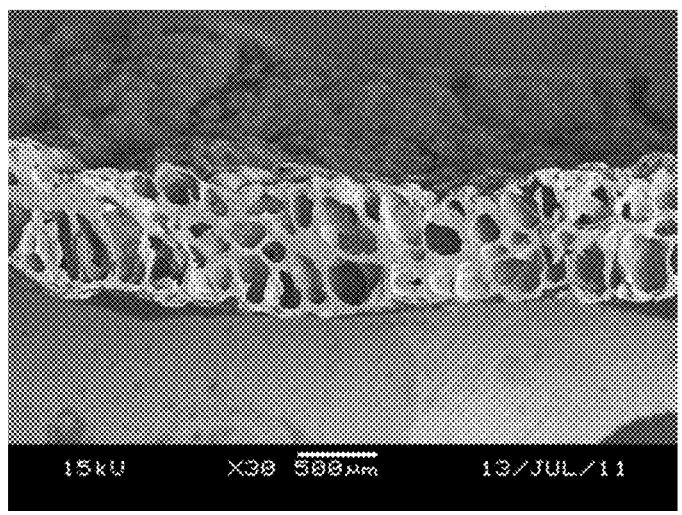
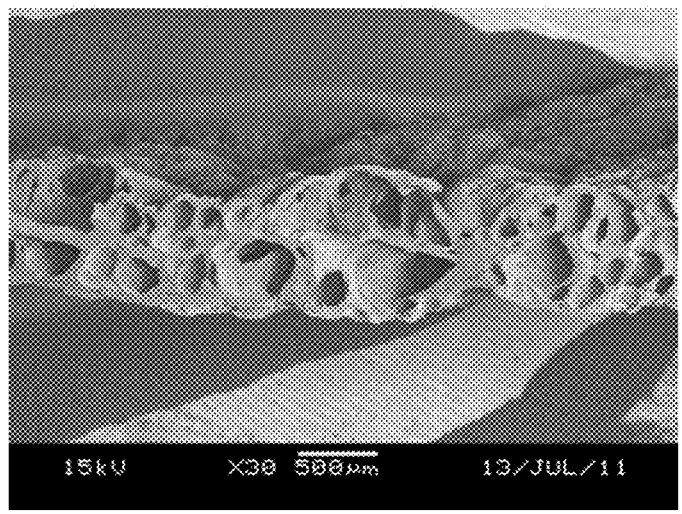

[Fig. 2]
ELECTRON MICROGRAPH OF VERTICAL SECTION OF EXAMPLE 2
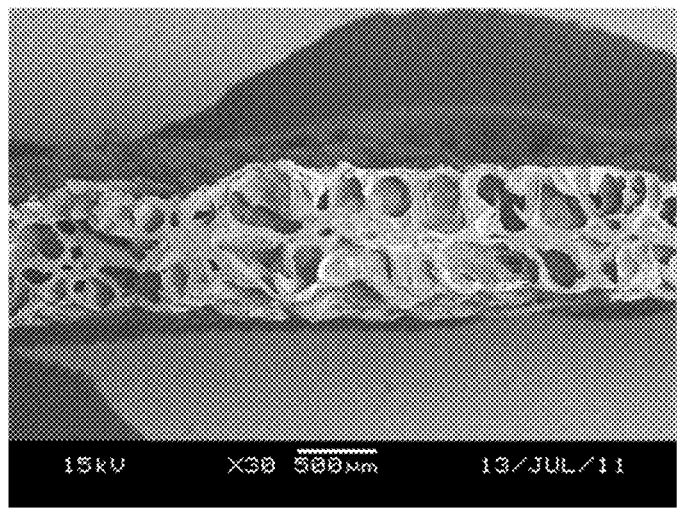
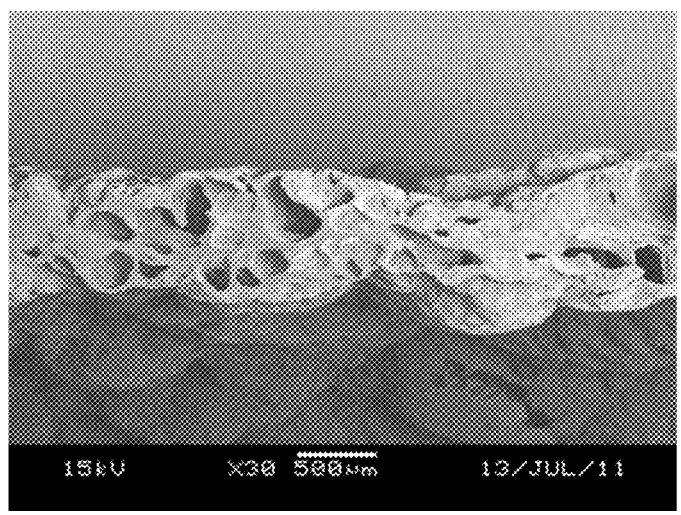
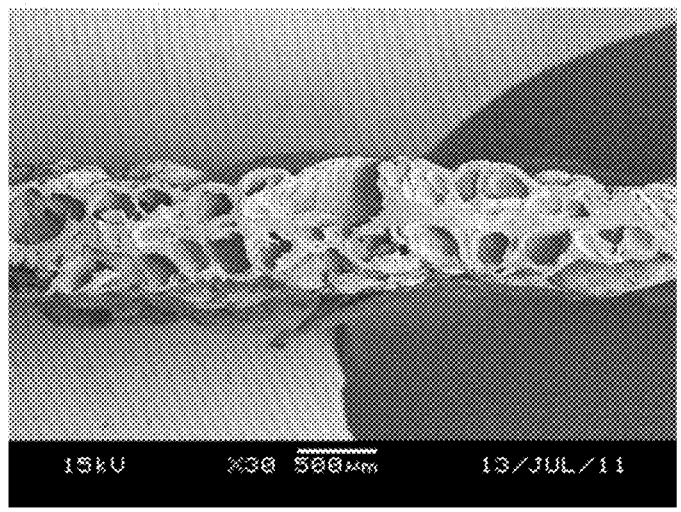

[Fig. 3]
ELECTRON MICROGRAPH OF VERTICAL SECTION OF EXAMPLE 3
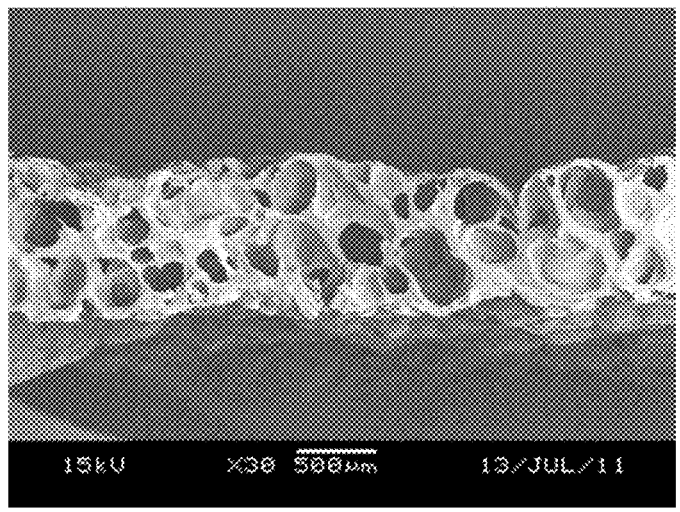
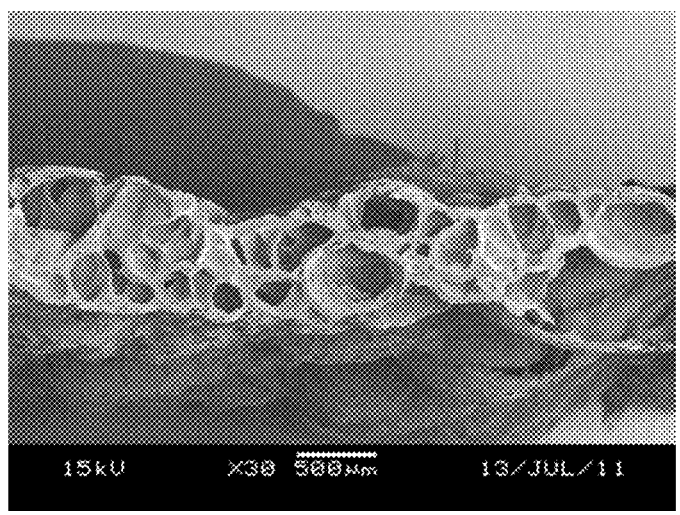
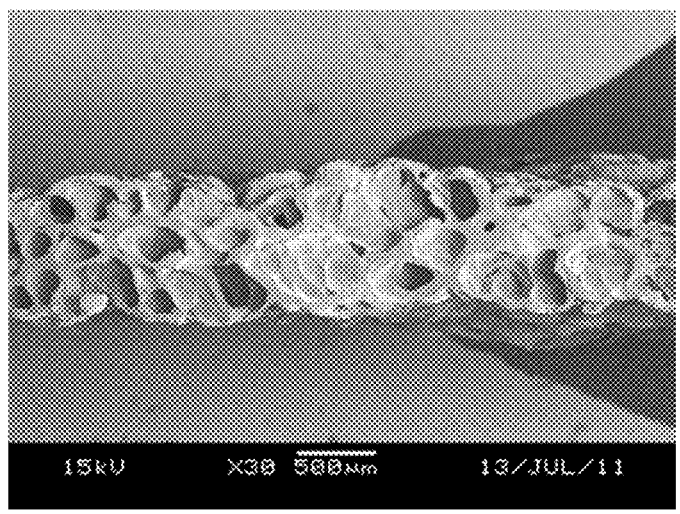

[Fig. 4]
ELECTRON MICROGRAPH OF VERTICAL SECTION OF EXAMPLE 4
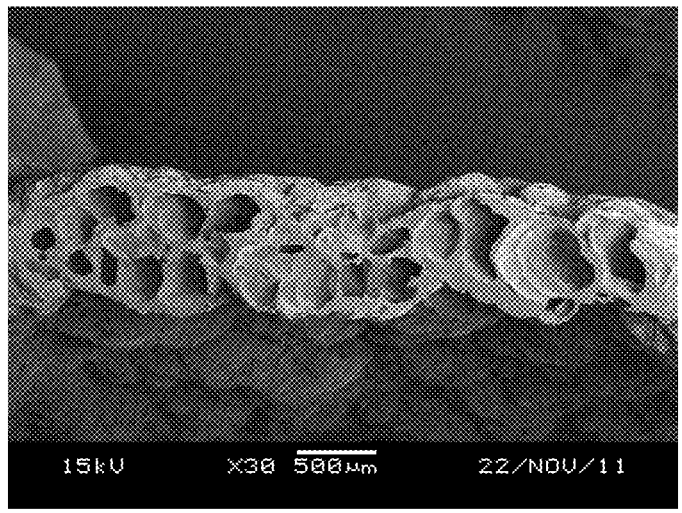
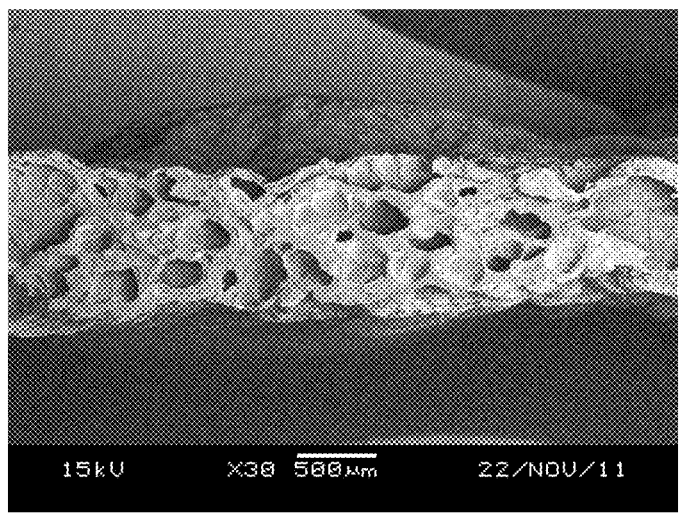
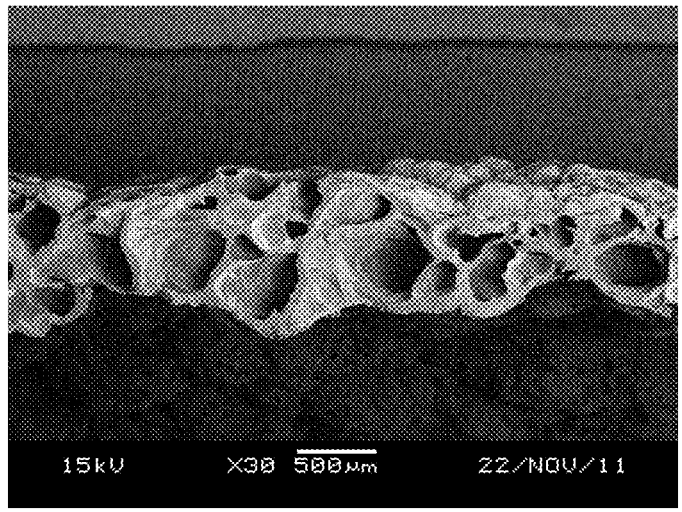

[Fig. 5]
ELECTRON MICROGRAPH OF VERTICAL SECTION OF EXAMPLE 5
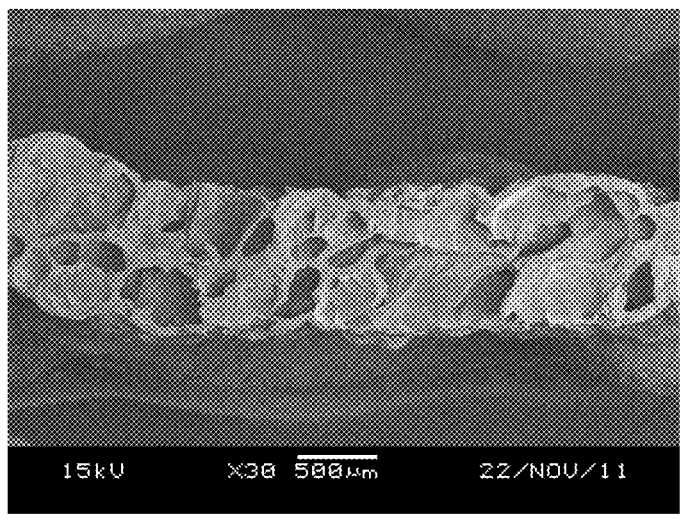
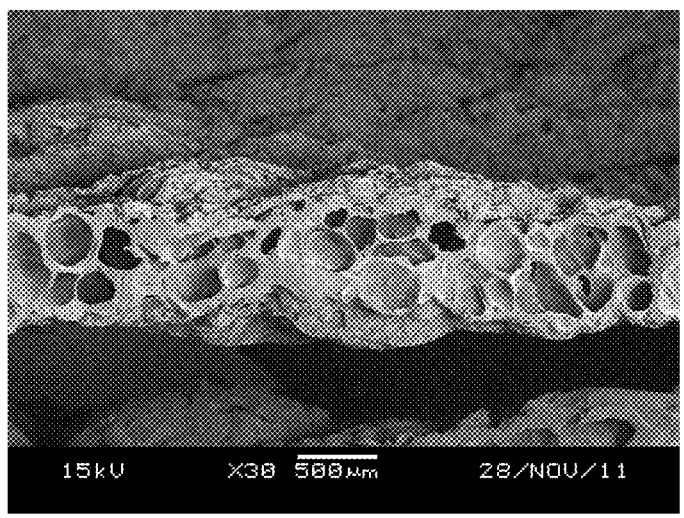
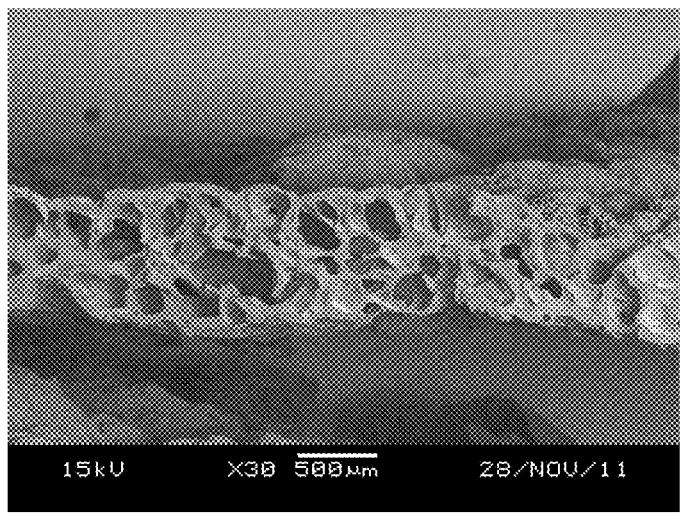

[Fig. 6]
ELECTRON MICROGRAPH OF VERTICAL SECTION OF COMPARATIVE EXAMPLE 1
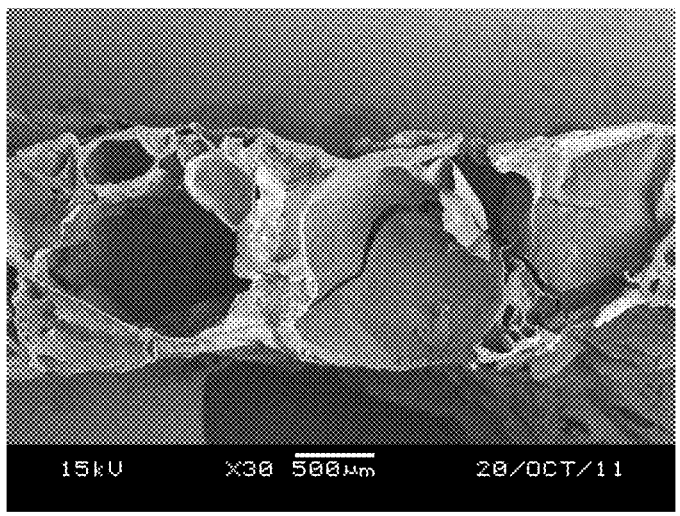
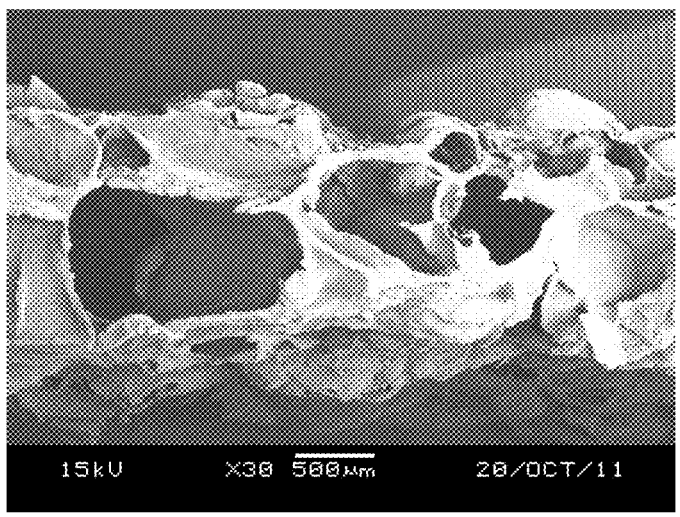
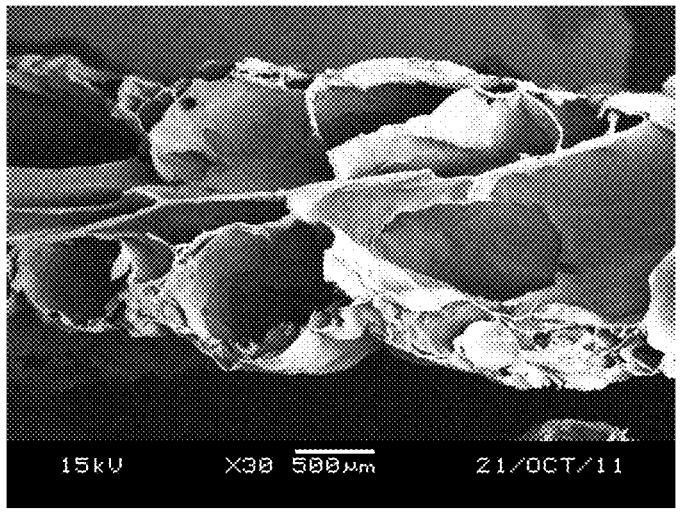

[Fig. 7]
ELECTRON MICROGRAPH OF VERTICAL SECTION OF COMPARATIVE EXAMPLE 2
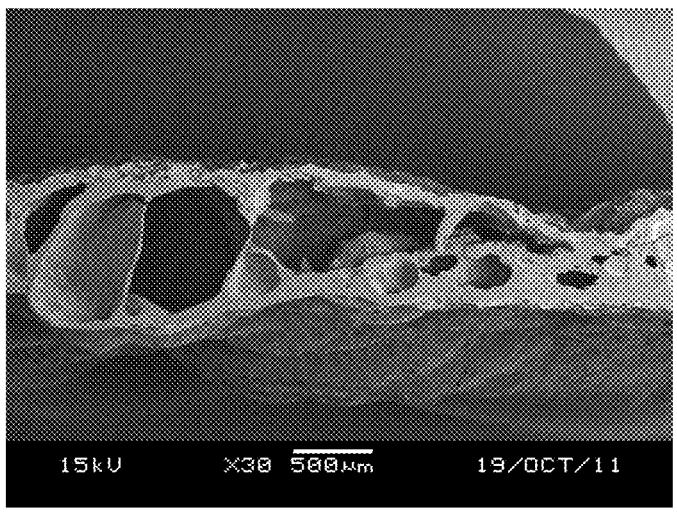
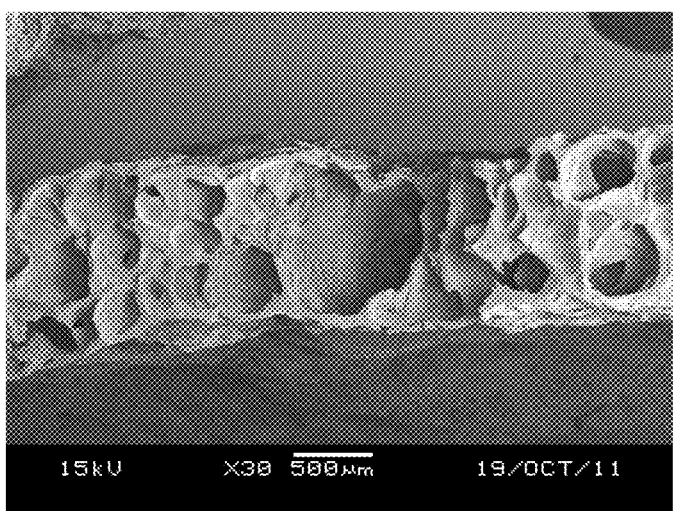
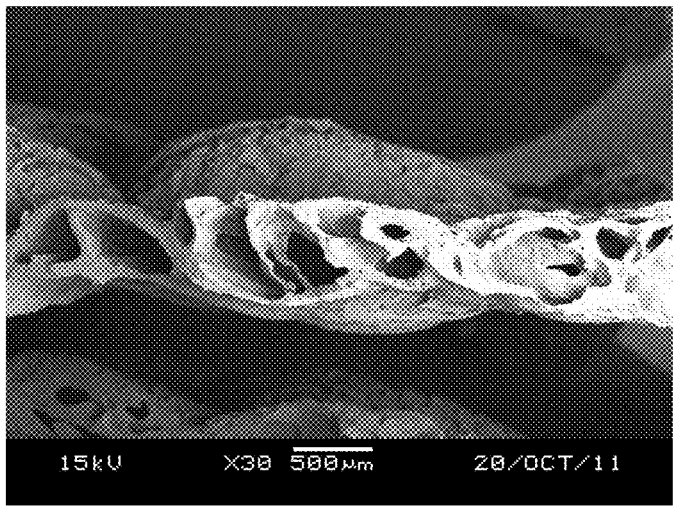

[Fig. 8]
ELECTRON MICROGRAPH OF VERTICAL SECTION OF COMPARATIVE EXAMPLE 3
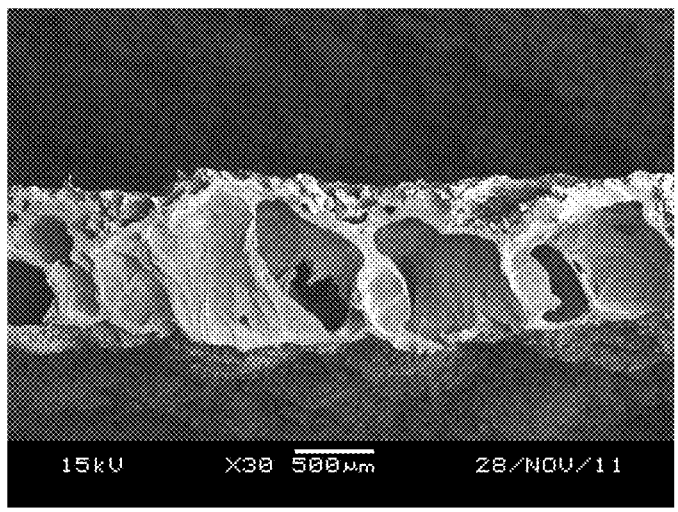
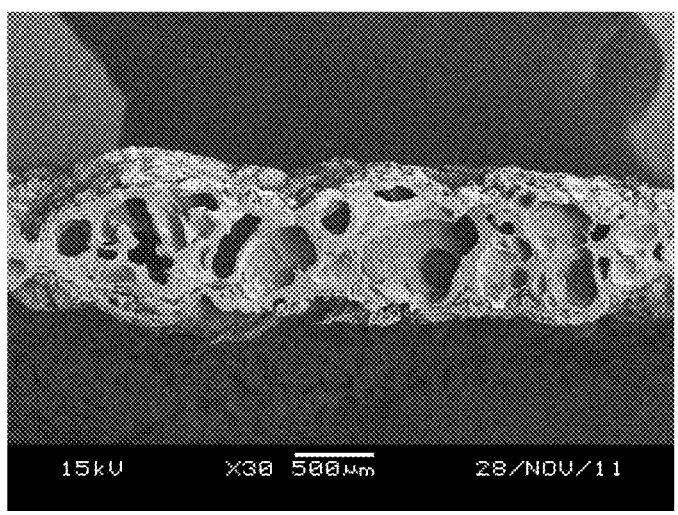
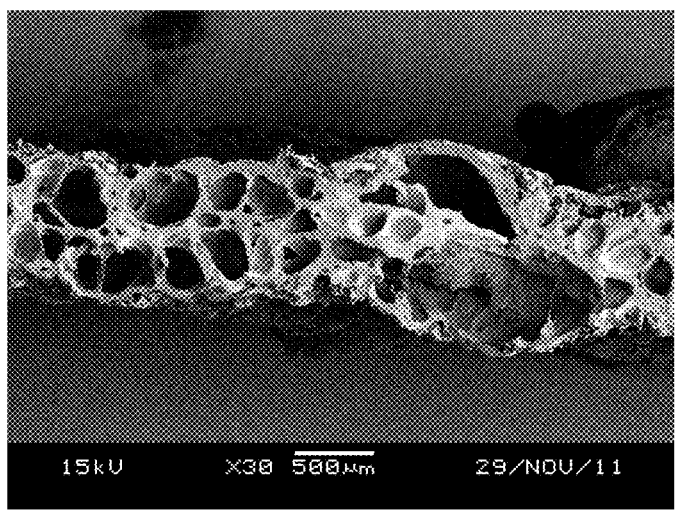

NON-FRIED POTATO CHIPS

TECHNICAL FIELD

The present invention relates to so-called non-fried potato chips that are potato chips not fried in oil.

BACKGROUND ART

Potato chips produced by frying thin potato slices in high-temperature oil have a unique crispy texture and a savory flavor. However, fried potato chips have a high oil content that reaches about 40% of the product weight, and therefore have a very high calorie content. In response to recent health trends, non-fried potato chips are commercially available which are produced without frying in oil and therefore have a low oil content. Some methods for producing such non-fried potato chips have been proposed (see Patent Documents 1 to 7).

However, non-fried potato chips produced by these conventional techniques do not have a light and crispy texture like fried potato chips but have a crunchy texture or a texture like thin paper, and are therefore not readily melted in the mouth. When kneaded dough is used as a raw material as in the case of fabricated potato chips, the conventional production methods can produce reasonable quality non-fried potato chips. However, particularly in the case of non-fried potato chips produced by directly using raw potato slices, the conventional techniques cannot achieve a crispy texture like fried potato chips.

Patent Document 1: JP-A-56-39760
Patent Document 2: JP-W-6-508518
Patent Document 3: JP-W-2000-508887
Patent Document 4: JP-A-2006-191871
Patent Document 5: Japanese Utility Model No. 3160399
Patent Document 6: JP-A-2005-245389
Patent Document 7: JP-W-2001-510686

DISCLOSURE OF THE INVENTION

Problems to be Solved by the Invention

It is therefore an object of the present invention to provide non-fried potato chips that are produced without frying in oil to reduce oil and calorie contents but have a crispy texture and high meltability in the mouth, which cannot be sufficiently achieved by the conventional techniques, and are therefore comparable to potato chips produced by frying in oil.

Means for Solving the Problems

In order to achieve the above object, the present inventors have focused attention on the structure of potato chips and have found that the above object can be achieved by allowing non-fried potato chips to have a number of uniform pores in their inside. The present inventors have further intensively studied to complete the present invention.

More specifically, the present invention relates to the following.

(1) Non-fried potato chips whose number of holes with a short diameter of 20 μm or more is 10/mm² or more and whose porosity is 35% to 65% when vertical sections of the non-fried potato chips are observed.

(2) The non-fried potato chips according to (1), wherein an average of average diameters (averages of long and short diameters) of the holes is 300 μm or less.

(3) The non-fried potato chips according to (1) or (2), wherein a coefficient of variation in the average diameters of the holes (standard deviation/average diameter) is 55% or less.

(4) The non-fried potato chips according to any one of (1) to (3), wherein an average of values of long diameter/short diameter of the holes is 2 or less.

(5) The non-fried potato chips according to any one of (1) to (4), wherein the number of the holes whose value of long diameter/short diameter is 2 or less is 5/mm² or more.

(6) The non-fried potato chips according to any one of (1) to (5), which are produced by a production method including a step of heating potato slices and a step of drying the potato slices.

(7) The non-fried potato chips according to any one of (1) to (6), which have an oil content of 25% or less.

Effects of the Invention

The non-fried potato chips according to the present invention are produced by sufficiently and uniformly puffing the inside of potato slices, and are therefore comparable in crispy texture and meltability in the mouth to fried potato chips. Here, the crispy texture refers to a texture such that food is readily broken into pieces when taken into the mouth and the pieces do not remain in the mouth. Further, the non-fried potato chips according to the present invention are produced without frying in oil, and therefore have lower oil and calorie contents and are healthier than fried potato chips.

BRIEF DESCRIPTION OF THE DRAWINGS

FIG. 1 shows electron micrographs (30-fold magnification) of vertical sections of arbitrarily-selected three non-fried potato chips according to an embodiment of the present invention (Example 1).

FIG. 2 shows electron micrographs (30-fold magnification) of vertical sections of arbitrarily-selected three non-fried potato chips according to the embodiment of the present invention (Example 2).

FIG. 3 shows electron micrographs (30-fold magnification) of vertical sections of arbitrarily-selected three non-fried potato chips according to the embodiment of the present invention (Example 3).

FIG. 4 shows electron micrographs (30-fold magnification) of vertical sections of arbitrarily-selected three non-fried potato chips according to the embodiment of the present invention (Example 4).

FIG. 5 shows electron micrographs (30-fold magnification) of vertical sections of arbitrarily-selected three non-fried potato chips according to the embodiment of the present invention (Example 5).

FIG. 6 shows electron micrographs (30-fold magnification) of vertical sections of arbitrarily-selected three non-fried potato chips commercially available (Comparative Example 1).

FIG. 7 shows electron micrographs (30-fold magnification) of vertical sections of arbitrarily-selected three non-fried potato chips according to a comparative example of the present invention (Comparative Example 2).

FIG. 8 shows electron micrographs (30-fold magnification) of vertical sections of arbitrarily-selected three non-fried potato chips according to another comparative example of the present invention (Comparative Example 3).

PREFERRED MODE FOR CARRYING OUT THE INVENTION

The non-fried potato chips according to the present invention are non-fried potato chips whose number of holes with a short diameter of 20 µm or more is about 10/mm² or more and whose porosity is about 35% to 65% when their vertical sections are observed. This indicates that the inside of the non-fried potato chips according to the present invention is sufficiently puffed and the non-fried potato chips have a number of pores the "short diameter" of the hole refers to the diameter in the shorter direction of the hole (length in the direction orthogonal to the long diameter of the hole in the vertical section). It is to be noted that the "long diameter" of the hole refers to the longest diameter of the hole in the longitudinal direction.

In the present invention, the "hole" refers to the shape of a pore formed in the non-fried potato chip and observed in the vertical section of the non-fried potato chip. Here, the "vertical section" of the non-fried potato chip refers to a cut section formed by manually cutting one non-fried potato chip of interest along its longitudinal direction. When the vertical section of one non-fired potato chip of interest is observed, the non-fried potato chip is cut into almost even halves so that a cut section is formed so as to pass through roughly the center of the non-fried potato chip, and the cut section is observed in a position about halfway between the center and the periphery of the cut section.

In the present invention, the "number of holes" refers to the average of numbers of holes of arbitrarily-selected 20 non-fried potato chips. The number of holes of one non-fried potato chip is determined by counting the number of holes per unit area observed in the vertical section with a certain length of the non-fried potato chip. In this specification, the "average" refers to an arithmetic average unless otherwise specified.

In the present invention, the "porosity" refers to the average of porosities of arbitrarily-selected 20 non-fried potato chips. The porosity of one non-fried potato chip is determined by dividing the sum of areas of holes observed in the vertical section with a certain length of the non-fried potato chip by the area of the vertical section with a certain length.

The non-fried potato chips according to the present invention are produced by sufficiently puffing the inside of potato as a raw material so that the number of holes with a short diameter of 20 µm or more observed in their vertical sections is as large as about 10/mm² or more and a porosity is adjusted to about 35% to 65%, and are therefore comparable in crispy texture and high meltability in the mouth to fried potato chips. The number of holes with a short diameter of 20 µm or more of the non-fried potato chips according to the present invention is about 10/mm² or more, preferably about 10/mm² to 20/mm², more preferably about 12/mm² to 16/mm². The porosity of the non-fried potato chips according to the present invention is about 35% to 65%, preferably about 45% to 60%, more preferably about 50% to 60%.

The average of average diameters of holes with a short diameter of 20 µm or more observed in the vertical sections of the non-fried potato chips according to the present invention is preferably about 300 µm or less, more preferably about 150 µm to 250 µm. In this specification, the "average diameter" of the hole refers to the average of the long diameter and the short diameter of holes observed in the vertical sections of arbitrarily-selected 20 non-fried potato chips. When the average of average diameters of holes with a short diameter of 20 µm or more is as small as 300 µm or less, the non-fried potato chips according to the present invention can have a more crispy texture and higher meltability in the mouth.

The coefficient of variation in the average diameters of holes with a short diameter of 20 µm or more observed in the vertical sections of the non-fried potato chips according to the present invention is preferably about 55% or less, more preferably about 50% or less. The "coefficient of variation" in the average diameters of holes of one non-fried potato chip according to the present invention is determined by dividing the standard deviation of average diameters of all the holes in the section with a certain length of the non-fried potato chip by the average of average diameters of all the holes (standard deviation/average diameter). In this specification, the "coefficient of variation" in the average diameters of holes refers to the average of coefficients of variation in the average diameters of holes of arbitrarily-selected 20 non-fried potato chips, which represents the relative dispersion of the average diameters of holes. The fact that the coefficient of variation in the average diameters of holes with a short diameter of 20 µm or more is about 55% or less means that the holes with a short diameter of 20 µm or more show relatively small variations in their average diameter and are uniform. When the holes with a short diameter of 20 µm or more show small variations in their diameter and are uniform, the non-fried potato chips according to the present invention can have a more crispy texture and higher meltability in the mouth.

The average of values determined by dividing the long diameter by the short diameter (long diameter/short diameter) of holes with a short diameter of 20 µm or more observed in the vertical sections of the non-fried potato chips according to the present invention (average of arbitrarily-selected 20 non-fried potato chips) is preferably about 2 or less. When the value determined by dividing the long diameter by the short diameter (long diameter/short diameter) of the hole is smaller, the hole is less distorted in shape and has a shape closer to a circle. More preferably, the average of numbers of holes with a short diameter of 20 µm or more and a value of long diameter/short diameter of 2 or less observed in the vertical sections of the non-fried potato chips according to the present invention (average of arbitrarily-selected 20 non-fried potato chips) is 5/mm² or more. When the holes are less distorted in shape and have a shape closer to a circle, more preferably when the number of holes less distorted in shape and having a shape closer to a circle is larger, the non-fried potato chips according to the present invention can have a more crispy texture and higher meltability in the mouth.

The non-fried potato chips according to the present invention are produced by a production method including a step of heating potato slices themselves and a step of drying the potato slices.

The non-fried potato chips according to the present invention preferably have an oil content of about 25% or less. More preferably, the oil content of the non-fried potato chips according to the present invention can be reduced to about 15% or less while the non-fried potato chips according to the present invention are not so different in taste from fried potato chips. This makes it possible for the non-fried potato chips according to the present invention to have a low calorie content.

Hereinbelow, one example of a method for producing the non-fried potato chips according to the present invention will be specifically described. It is to be noted that the present inventors have performed various experiments to develop a method for producing non-fried potato chips having a satisfactory texture, and as a result have found that there is more than one way to obtain the potato chips according to the present invention, and the non-fried potato chips according to the present invention can be produced by a plurality of novel production methods. First, a method in which treatment using microwaves, treatment using overheated steam, and treatment involving blowing high-temperature and high-velocity airflow are performed in combination will be described below. Then, another method will be described.

As a raw material, thin slices of raw potatoes are used. Raw potatoes are washed, peeled if necessary, trimmed, and cut into thin slices with a slicer or the like. The thickness of the slices is preferably about 0.8 mm to 2.0 mm, more preferably about 1.0 mm to 1.4 mm, even more preferably about 1.0 mm to 1.1 mm in terms of the texture or the like of a product. It is to be noted that raw potatoes may be cut into slices having smooth surfaces, but may also be cut into slices having a W-shaped (jagged) cross section.

These potato slices may be used directly. Alternatively, these potato slices may be immersed in cold or hot water and then dewatered to wash away starch from the surface of the potato slices and prevent discoloration caused by long-time exposure to air.

Oil is preferably applied to the potato slices. It is considered that the potato slices can be heated to a temperature exceeding 100° C. in a heating step, to be described later, by previously applying oil to the potato slices so that the product can have a crispy texture. The application of oil is preferably performed before heat treatment involving blowing high-temperature and high-velocity airflow to be described later. That is, the application of oil may be performed before heating with microwaves to be described later or before or after heating with overheated steam to be described later or may be performed both before heating with microwaves and before or after heating with overheated steam.

The oil to be applied is not particularly limited as long as the product can have a crispy texture, and examples thereof include rice refined oil and palm olein oil. The amount of the oil to be applied may be as small as about 1% by weight or more of the weight of the potato slices. It is to be noted that the amount of the oil may be adjusted to improve the taste of the final product. A method for applying the oil may be appropriately selected from, for example, spraying, coating, and immersion.

The thus prepared potato slices or potato slices with oil are heated with microwaves. Here, heating with microwaves refers to heating by the interaction between microwaves and the potato slices, that is, heating by absorption of microwaves by the potato slices due to dielectric loss, and conversion of their energy to heat. A means for heating with microwaves is not particularly limited, and an example thereof includes a microwave oven. In the case of 500 W (10 to 20 g of the potato slices), the heating is preferably performed for about 10 to 30 seconds, particularly preferably about 20 seconds. It is considered that when the potato slices are heated with microwaves in this way, the inside of the potato slices is quickly heated and gelatinized, and therefore the potato slices are more uniformly puffed by later heating with high-temperature and high-velocity airflow so that the product can have a crispy texture.

Then, the potato slices are heated with overheated steam. The overheated steam refers to saturated steam heated to 100° C. or higher at ordinary pressure. The potato slices are heated with water vapor having a large amount of heat under low-oxygen conditions. The heating with overheated steam is performed at about 150° C. to 220° C., particularly preferably about 180° C. to 210° C. for about 20 seconds to 1 minute. It is considered that when the potato slices are heated with high-temperature overheated steam in this way, the surface of the potato slices is heated at high temperature and gelatinized so that the product can have a crispy texture.

After the above-described heating steps and the application of oil are performed, the potato slices are heated by blowing high-temperature and high-velocity airflow thereonto to gelatinize and puff the potato slices. Here, heat treatment involving blowing high-temperature and high-velocity airflow refers to one performed by blowing high-temperature and high-velocity airflow jetted through, for example, a slit- or tube-shaped nozzle onto the potato slices. It is to be noted that the heat treatment involving blowing high-temperature and high-velocity airflow is mainly intended to sufficiently puff and dry the potato slices to obtain potato chips.

The heat treatment involving blowing high-temperature and high-velocity airflow is performed at at least about 100° C. In order to achieve a more crispy texture, the heat treatment involving blowing high-temperature and high-velocity airflow is preferably performed at a temperature of 180° C. or higher and an air velocity of about 50 m/s or higher, more preferably at a temperature of about 200° C. or higher for about 1 minute and 30 seconds to 3 minutes to the extent that the potato slices do not burn. More specifically, when the temperature and air velocity of the airflow are about 200° C. and about 60 m/s, respectively, the heat treatment may be performed for, for example, about 3 minutes. When the temperature of the airflow is less than about 180° C., the product is likely to have a crunchy hard texture. However, when a hard texture is desired, the heat treatment may be performed at about 140° C. Further, when the air velocity of the airflow is less than about 50 m/s, the potato slices are less likely to puff so that the final product has a hard texture. For this reason, the air velocity of the airflow is preferably 50 m/s or higher. Further, when a reduction in the production of acrylamide is desired, the potato slices are preferably heated at about 250° C. or less to the extent that they do not burn.

A device for generating such high-temperature and high-velocity airflow as described above is not particularly limited as long as the potato slices can be puffed and dried. However, a device is preferred in which airflow supplied from a fan is jetted through a number of slit- or tube-shaped nozzles provided above a conveyor that runs through a drier to blow high-temperature and high-velocity hot air onto an object on the conveyor. More specifically, a device disclosed in JP-A-9-210554 or JP-A-2003-90681 or a vertical air impingement- or fluidized bed-type heat treatment device (e.g., THERMOZONE (registered trademark) manufactured by ARAKAWA CO., LTD.) is used.

In this way, the potato slices are puffed and dried by heat treatment with high-temperature and high-velocity airflow. However, there is a case where the non-fried potato chips are burned by continuously blowing such high-temperature airflow thereonto. For this reason, after puffed by heat treatment with high-temperature and high-velocity airflow, the potato slices are preferably subjected to final drying by reducing the air velocity or temperature of the airflow or by a conventional hot-air drying method performed at about 80° C. to 120° C. Such a hot-air drying method is preferably performed by, for example, drying the potato slices in a drying chamber at a temperature of about 80° C. to 120° C. Such a final drying step is not particularly limited as long as the potato slices can be dried to reduce their moisture content to 3% or less, and may be performed by an appropriate drying method or a combination of a plurality of other drying methods. It is to be noted that the potato slices are preferably dried until their final moisture content is reduced to about 2% or less.

Hereinbelow, another production method will be described.

In the above-described method, heat treatment with microwaves, heat treatment with overheated steam, and heat treatment involving blowing high-temperature and high-velocity airflow are performed in this order, but the heat treatment with microwaves first performed may be changed to heat treatment with specific overheated steam. Overheated steam has a large amount of heat, and therefore if heated with overheated steam for a long time, the potato slices are dried and a crispy texture cannot be achieved. However, when treated with overheated steam for a short time, the potato slices are quickly gelatinized due to a large amount of heat of the overheated steam. Therefore, at least the first heating with overheated steam is performed for a short time of about 1 minute or less, and then the potato slices are taken out of a steam chamber before dried, cooled, and subjected to the next treatment with overheated steam. Once the potato slices are taken out of a steam chamber and cooled, moisture is given to the potato slices when the potato slices are again heat-treated with overheated steam due to action similar to dew condensation caused by the temperature difference between an object to be heated and overheated steam, and therefore gelatinization is allowed to proceed by heating the potato slices. More specifically, for example, heat treatment with overheated steam at a temperature of 190° C. and a steam flow rate of 180 kg/h for 30 seconds may be repeated twice.

Alternatively, a production method using no overheated steam may be employed. This production method is performed by repeatedly blowing high-temperature and high-velocity airflow. However, high-temperature and high-velocity airflow quickly dries the potato slices, which makes it impossible to obtain the potato chips according to the present invention, having a desired crispy texture. Therefore, in this production method, at least the first blowing of airflow is performed using airflow mixed with a large amount of steam to sufficiently gelatinize the potato slices at high temperature. It is considered that this has a similar effect on the potato slices to that of the above-described heating with overheated steam. More specifically, this production method may be performed by, for example, blowing saturated steam at a steam flow rate of 180 kg/h into a steam chamber in which the potato slices are heated by blowing high-temperature and high-velocity airflow onto the surface of the potato slices at a temperature of 150° C. and an air velocity of 65 m/s for 30 seconds, taking the potato slices out of the steam chamber once, and again blowing wet high-temperature and high-velocity airflow onto the potato slices under the same conditions as described above for 30 seconds to heat the potato slices.

After the heat treatment with overheated steam performed under specific conditions or the heat treatment with high-temperature and high-velocity airflow mixed with a large amount of steam, the potato slices are puffed and dried by blowing high-temperature and high-velocity airflow thereonto in the same manner as the production method first described above. This heat treatment is preferably performed without burning the potato slices under the same conditions, such as temperature and air velocity, as the production method first described above, that is, at a temperature of 180° C. or higher and an air velocity of 50 m/s or higher. Then, final drying is also the same as that in the production method described above.

In any of the above-described production methods, the amount of the oil applied to the potato slices is very small. Therefore, the oil content of the product according to the present invention can be reduced to one-half or less and even further to ⅓ or less of that of a fried product while the product according to the present invention is comparable in crispy texture to the fried product. This is effective also in, for example, reducing the amount of production of acrylamide suspected of being a carcinogen or the like as compared to the fried product.

The non-fried potato chips according to the present invention, produced in this way, have an oil content of about 25% or less. The oil content of the non-fried potato chips can be reduced to about 15% or less while the non-fried potato chips according to the present invention are not so different in taste from fried potato chips. By adjusting the oil content in this way, the calorie corresponding to a reduced oil content can be reduced.

After the drying, the potato chips may be seasoned by spraying seasoning oil and sprinkling salt, spices, or the like. Depending on the oil content of the product, the amount of the seasoning oil is preferably about 2% to 5% of the weight of the potato chips after drying, and the amount of the seasoning powder such as salt or a flavor enhancer is preferably about 5% of the weight of the potato chips after drying.

Although the examples of a method for producing the non-fried potato chips according to the present invention have been described above, it should be understood that a method for producing the non-fried potato chips according to the present invention other than the above-described production methods may be used as long as the non-fried potato chips according to the present invention can be produced.

After produced, the non-fried potato chips according to the present invention can be provided as a product hermetically sealed in a bag or a package of an aluminum-evaporated film or the like, impervious to oxygen and moisture.

EXAMPLES

Hereinbelow, the present invention will be described in detail with reference to examples and test examples of the present invention. It should be understood that the present invention should not be interpreted as being limited to the following examples and test examples.

<Measurement Items and Measurement Methods>

Each of non-fried potato chips to be measured obtained in the following examples and comparative examples was manually cut into almost even halves along its longitudinal direction (cut in a position selected by visual observation where surface irregularities were not particularly noticeable), and its cut section including a certain area (about 4 mm) located in a position half way between the center and the periphery thereof was sampled. Then, the non-fried potato chip was degreased with acetone, and gold was evaporated onto the cut section. The shapes of holes formed in the cut section by pores in the non-fried potato chip were observed using a scanning electron microscope at 30-fold magnification to measure the following items.

1. Number of holes with short diameter of 20 μm or more
more number of holes with a short diameter of 20 μm or more observed in the cut section with a certain length (about 4 mm) of one non-fried potato chip was counted to calculate the number of holes with a short diameter of 20 μm or more per $mm^2$ of cross-sectional area (holes/$mm^2$) (hole with a short diameter of 20 μm or more was regarded as "hole").

The number of holes with a short diameter of 20 µm or more per mm² of cross-sectional area of each of arbitrarily-selected 20 non-fried potato chips was calculated, and the average of numbers of holes of the 20 non-fried potato chips was determined as the "number of holes with short diameter of 20 µm or more".

2. Porosity

The area of each of holes observed in the cut section with a certain length (about 4 mm) of one non-fried potato chip was calculated. The total area of the holes was divided by the cross-sectional area of the cut section with a certain length to determine the porosity of the one non-fried potato chip. The porosity of each of arbitrarily-selected 20 non-fried potato chips was measured, and the average of porosities of the 20 non-fried potato chips was determined as "porosity".

3. Average of Average Diameters of Holes

The long diameter (diameter in longitudinal direction) and short diameter (diameter in short direction) of each of holes with a short diameter of 20 µm or more observed in the cut section with a certain length (about 4 mm) of one non-fried potato chip were measured, and the average of the long diameter and the short diameter was calculated and defined as the average diameter of the hole. The sum of the thus measured and calculated average diameters of all the holes was divided by the number of the holes observed in the cut section with a certain length to determine the average of average diameters of holes of the one non-fried potato chip. The average of average diameters of holes of each of arbitrarily-selected 20 non-fried potato chips was measured, and the average of average diameters of holes of each of the 20 non-fried potato chips was determined as the "average of average diameters of holes".

4. Coefficient of Variation in Average Diameters of Holes

The standard deviation of average diameters of all the holes with a short diameter of 20 µm or more observed in the cut section with a certain length (about 4 mm) of one non-fried potato chip was divided by the average of average diameters of all the holes, and the resulting value was defined as the coefficient of variation in the average diameters of holes of the one non-fried potato chip. The coefficient of variation in the average diameters of holes of each of arbitrarily-selected 20 non-fried potato chips was measured, and the average of coefficients of variation of the 20 non-fried potato chips was determined as the "coefficient of variation in average diameters of holes".

5. Value of Long Diameter/Short Diameter of Hole

The ratio of the long diameter to the short diameter of each of holes with a short diameter of 20 µm or more observed in the cut section with a certain length (about 4 mm) of one non-fried potato chip was calculated. The average of ratios of the long diameter to the short diameter of all the holes was calculated and defined as the value of long diameter/short diameter of hole of the one non-fried potato chip. The value of long diameter/short diameter of hole of each of arbitrarily-selected 20 non-fried potato chips was measured, and the average of values of long diameter/short diameter of holes of the 20 non-fried potato chips was determined as "value of long diameter/short diameter of hole".

6. Number of Holes Whose Value of Long Diameter/Short Diameter of Hole=2 or Less The number of holes whose short diameter was 20 µm or more and value of long diameter/short diameter of hole was 2 or less observed in the cut section of one non-fried potato chip was counted. The number of holes whose value of long diameter/short diameter of hole was 2 or less of each of arbitrarily-selected 20 non-fried potato chips was counted, and the average of numbers of holes of the 20 non-fried potato chips was determined as the "number of holes whose value of long diameter/short diameter of hole=2 or less".

7. Sensory Evaluation

Sensory evaluation was performed on non-fried potato chips by 5 panelists according to the following criteria:

A: having a crispy texture and high meltability in the mouth and being comparable in texture to fried potato chips;

B: being slightly inferior to fried potato chips but having a sufficient crispy texture so that the panelists did not notice that the potato chips were non-fried until it was pointed out to the panelists; and C: having a crunchy texture different from the texture of fried potato chips.

The present invention is directed to non-fried potato chips having a texture evaluated as A or B, and is ultimately directed to non-fried potato chips having a texture evaluated as A. Non-fried potato chips having a texture evaluated as A or B are regarded as having the effect of the present invention.

Example 1

Potatoes (breed: TOYOSHIRO) suitable for potato chips were washed, peeled with a peeler, and cut into slices having a thickness of 1.0 mm to 1.1 mm with a slicer. The potato slices were spread, and palm olein oil was sprayed onto the potato slices in an amount of 2 wt % of the weight of the potato slices.

Twenty grams of the potato slices were placed in a microwave oven with an output power of 500 W without overlapping more than the 2 potato slices and heated with microwaves for 20 seconds.

After the heating with microwaves, the potato slices were heated for 30 seconds with overheated steam in a steam chamber to which the overheated steam was supplied at a steam flow rate of 180 kg/h so that the temperature of the overheated steam impinging on the surface of the potato slices was 190° C.

Then, the potato slices were heat-treated by blowing high-temperature and high-velocity airflow with an air velocity of 60 m/s and a temperature of 200° C. onto them for 3 minutes using a high-temperature and high-velocity airflow heat treatment device (THERMOZONE (registered trademark) manufactured by ARAKAWA CO., LTD., fluidized bed (air bed)-type heat treatment device) equipped with a number of thin tube-shaped jet nozzles located above a conveyor.

Finally, the potato slices were subjected to final drying for 60 minutes in a hot-air drier at a temperature of 85° C. and an air velocity of 4 m/s until their moisture content was reduced to 2% to produce non-fried potato chips.

Three of the thus produced non-fried potato chips of Example 1 were arbitrarily selected, and micrographs (magnification: 30-fold) of their vertical sections taken with a scanning electron microscope (manufactured by JEOL Ltd., model JSM-6380LA, the same scanning electron microscope was used in the following examples and comparative examples) are shown in FIG. 1. As can be seen from FIG. 1, the inside of the non-fried potato chips of Example 1 was sufficiently puffed, and a number of pores were present.

Twenty of the non-fried potato chips of Example 1 were arbitrarily selected as samples, and the measurement results of the above-described measurement items 1 to 6 of each of the samples and the average and standard deviation of the measurement results of each of the measurement items 1 to 6 are shown in Table 1.

TABLE 1

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 12.8 | 40% | 195 | 36% | 1.97 | 9.5 |
| 2 | 16.9 | 51% | 185 | 43% | 1.52 | 15.3 |
| 3 | 13.3 | 56% | 207 | 58% | 1.69 | 11.1 |
| 4 | 10.1 | 48% | 235 | 43% | 1.74 | 7.3 |
| 5 | 12.0 | 54% | 212 | 62% | 1.76 | 9.8 |
| 6 | 11.2 | 58% | 245 | 46% | 1.83 | 8.0 |
| 7 | 11.8 | 57% | 233 | 45% | 1.70 | 10.7 |
| 8 | 10.7 | 50% | 235 | 44% | 1.71 | 8.7 |
| 9 | 10.3 | 46% | 233 | 37% | 1.69 | 8.4 |
| 10 | 13.2 | 44% | 201 | 44% | 1.78 | 11.0 |
| 11 | 13.7 | 51% | 197 | 62% | 1.68 | 11.1 |
| 12 | 14.3 | 59% | 219 | 45% | 1.85 | 12.3 |
| 13 | 13.9 | 61% | 219 | 52% | 1.74 | 11.2 |
| 14 | 13.4 | 55% | 222 | 33% | 1.58 | 12.1 |
| 15 | 15.5 | 54% | 200 | 46% | 1.75 | 11.8 |
| 16 | 14.1 | 57% | 225 | 35% | 1.87 | 10.7 |
| 17 | 14.1 | 50% | 201 | 46% | 1.73 | 12.0 |
| 18 | 13.1 | 47% | 211 | 37% | 1.75 | 9.5 |
| 19 | 13.3 | 50% | 212 | 43% | 1.90 | 9.2 |
| 20 | 13.5 | 39% | 185 | 50% | 1.86 | 10.3 |
| Average of 20 samples | 13.1 | 51% | 214 | 45% | 1.75 | 10.5 |
| Standard deviation | 1.7 | 6% | 17 | 8% | 0.11 | 1.8 |

Further, the sensory evaluation was performed on the non-fried potato chips of Example 1. As a result, the non-fried potato chips were evaluated as A, because they were crispy and readily melted in the mouth and their texture was almost the same as that of fried potato chips.

Further, the non-fried potato chips of Example 1 had an oil content of 8% and a calorie content of 414 kcal/100 g. That is, the oil and calorie contents of the non-fried potato chips of Example 1 were significantly reduced as compared to a commercially-available common fried product (oil content: about 40%, calorie content: 570 kcal/100 g).

Example 2

Non-fried potato chips were produced in the same manner as in Example 1 except that the step of spraying palm olein oil in an amount of 2 wt % of the weight of potato slices was performed after heating with microwaves but before heating with overheated steam in the production method employed in Example 1.

Three of the thus produced non-fried potato chips of Example 2 were arbitrarily selected, and micrographs (30-fold magnification) of their vertical sections taken with the scanning electron microscope are shown in FIG. 2. As can be seen from FIG. 2, the inside of the non-fried potato chips of Example 2 was also sufficiently puffed, and a number of pores were present.

Twenty of the non-fried potato chips of Example 2 were arbitrarily selected as samples, and the measurement results of the above-described measurement items 1 to 6 of each of the samples and the average and standard deviation of the measurement results of each of the measurement items 1 to 6 are shown in Table 2.

TABLE 2

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 15.5 | 50% | 185 | 55% | 1.61 | 13.5 |
| 2 | 21.3 | 45% | 151 | 50% | 1.55 | 19.8 |
| 3 | 15.8 | 50% | 189 | 44% | 1.65 | 13.6 |
| 4 | 21.9 | 57% | 171 | 46% | 1.66 | 19.4 |
| 5 | 16.3 | 53% | 193 | 40% | 1.55 | 14.4 |
| 6 | 18.9 | 51% | 172 | 49% | 1.62 | 16.6 |
| 7 | 14.3 | 57% | 219 | 35% | 1.60 | 12.3 |
| 8 | 18.4 | 43% | 166 | 38% | 1.69 | 15.1 |
| 9 | 14.2 | 63% | 227 | 41% | 1.71 | 12.0 |
| 10 | 15.5 | 64% | 210 | 52% | 1.55 | 14.8 |
| 11 | 14.6 | 52% | 200 | 49% | 1.81 | 13.1 |
| 12 | 17.2 | 59% | 199 | 44% | 1.67 | 14.5 |
| 13 | 16.5 | 59% | 205 | 43% | 1.69 | 13.2 |
| 14 | 14.6 | 50% | 193 | 48% | 1.52 | 13.2 |

TABLE 2-continued

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 15 | 14.2 | 49% | 192 | 54% | 1.68 | 11.7 |
| 16 | 12.6 | 64% | 234 | 53% | 1.78 | 8.7 |
| 17 | 12.5 | 54% | 223 | 46% | 1.79 | 10.1 |
| 18 | 14.5 | 47% | 192 | 45% | 1.79 | 9.5 |
| 19 | 15.6 | 44% | 181 | 41% | 1.53 | 14.2 |
| 20 | 13.4 | 48% | 201 | 46% | 1.60 | 10.9 |
| Average of 20 samples | 15.9 | 53% | 195 | 46% | 1.65 | 13.5 |
| Standard deviation | 2.6 | 6% | 21 | 5% | 0.09 | 2.9 |

Further, the sensory evaluation was performed on the non-fried potato chips of Example 2. As a result, the non-fried potato chips were evaluated as A, because they were crispy and readily melted in the mouth and their texture was almost the same as that of fried potato chips.

Example 3

Non-fried potato chips were produced in the same manner as in Example 1 except that the step of spraying palm olein oil in an amount of 2 wt % of the weight of potato slices was performed after heating with overheated steam but before heating with high-temperature and high-velocity airflow in the production method employed in Example 1.

Three of the thus produced non-fried potato chips of Example 3 were arbitrarily selected, and micrographs (30-fold magnification) of their vertical sections taken with the scanning electron microscope are shown in FIG. 3. As can be seen from FIG. 3, the inside of the non-fried potato chips of Example 3 was sufficiently puffed, and a number of pores were present.

Twenty of the non-fried potato chips of Example 3 were arbitrarily selected as samples, and the measurement results of the above-described measurement items 1 to 6 of each of the samples and the average and standard deviation of the measurement results of each of the measurement items 1 to 6 are shown in Table 3.

TABLE 3

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 16.9 | 39% | 160 | 48% | 1.76 | 13.6 |
| 2 | 14.4 | 48% | 196 | 42% | 1.67 | 13.2 |
| 3 | 14.2 | 65% | 224 | 47% | 1.54 | 13.1 |
| 4 | 10.0 | 49% | 235 | 50% | 1.66 | 8.3 |
| 5 | 12.5 | 59% | 233 | 47% | 1.76 | 9.3 |
| 6 | 13.5 | 59% | 218 | 52% | 1.71 | 10.4 |
| 7 | 15.2 | 53% | 200 | 42% | 1.52 | 13.9 |
| 8 | 15.5 | 54% | 198 | 47% | 1.62 | 12.7 |
| 9 | 13.1 | 63% | 238 | 37% | 1.55 | 11.4 |
| 10 | 15.2 | 61% | 209 | 48% | 1.50 | 14.3 |
| 11 | 13.5 | 51% | 207 | 46% | 1.67 | 11.5 |
| 12 | 12.8 | 59% | 226 | 52% | 1.71 | 10.2 |
| 13 | 14.1 | 46% | 196 | 39% | 1.76 | 11.7 |
| 14 | 12.9 | 58% | 225 | 47% | 1.68 | 10.2 |
| 15 | 13.3 | 69% | 247 | 39% | 1.61 | 11.5 |
| 16 | 12.1 | 61% | 230 | 54% | 1.59 | 10.1 |
| 17 | 12.7 | 59% | 232 | 43% | 1.70 | 9.5 |
| 18 | 12.7 | 62% | 234 | 48% | 1.59 | 11.1 |
| 19 | 14.1 | 50% | 198 | 51% | 1.70 | 11.3 |
| 20 | 15.5 | 48% | 182 | 52% | 1.68 | 13.3 |
| Average of 20 samples | 13.7 | 56% | 214 | 46% | 1.65 | 11.5 |
| Standard deviation | 1.5 | 8% | 22 | 5% | 0.08 | 1.7 |

Further, the sensory evaluation was performed on the non-fried potato chips of Example 3. As a result, the non-fried potato chips were evaluated as A, because they were crispy and readily melted in the mouth and their texture was almost the same as that of fried potato chips.

Example 4

Non-fried potato chips were produced by performing heating with overheated steam instead of heating with microwaves in a microwave oven with an output power of 500 W performed in the production method employed in Example 1 and then by performing heating with overheated steam and heating with high-temperature and high-velocity airflow in the same manner as in Example 1.

More specifically, oil was sprayed onto potato slices in the same manner as in Example 1, and the potato slices were heated with overheated steam for 30 seconds in a steam chamber to which the overheated steam was supplied at a steam flow rate of 180 kg/h so as to impinge on the surface of the potato slices at a temperature of 190° C. Then, the potato slices were taken out of the steam chamber, and after 10 seconds, the potato slices were again heated with overheated steam for 30 seconds in the steam chamber to which the overheated steam was supplied at a steam flow rate of 180 kg/h so that the temperature of the overheated steam impinging on the surface of the potato slices was 190° C. Then, the potato slices were heated by blowing high-temperature and high-velocity airflow thereonto and then subjected to final drying at a temperature of 85° C. in the same manner as in Example 1.

Three of the thus produced non-fried potato chips of Example 4 were arbitrarily selected, and micrographs (30-fold magnification) of their vertical sections taken with the scanning electron microscope are shown in FIG. 4. As can be seen from FIG. 4, the inside of the non-fried potato chips of Example 4 was sufficiently puffed, and a number of pores were present.

Twenty of the non-fried potato chips of Example 4 were arbitrarily selected as samples, and the measurement results of the above-described measurement items 1 to 6 of each of the samples and the average and standard deviation of the measurement results of each of the measurement items 1 to 6 are shown in Table 4.

TABLE 4

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 13.2 | 53% | 205 | 53% | 1.62 | 11.0 |
| 2 | 16.5 | 37% | 160 | 47% | 1.70 | 14.5 |
| 3 | 16.5 | 38% | 159 | 48% | 1.61 | 15.1 |
| 4 | 15.6 | 46% | 186 | 37% | 1.57 | 13.9 |
| 5 | 15.2 | 51% | 197 | 41% | 1.70 | 12.2 |
| 6 | 10.0 | 58% | 248 | 52% | 1.57 | 7.8 |
| 7 | 12.7 | 66% | 236 | 50% | 1.55 | 10.8 |
| 8 | 11.6 | 47% | 210 | 54% | 1.73 | 8.9 |
| 9 | 13.0 | 47% | 204 | 46% | 1.93 | 11.4 |
| 10 | 14.0 | 50% | 204 | 41% | 1.56 | 11.5 |
| 11 | 12.1 | 58% | 222 | 58% | 1.74 | 9.5 |
| 12 | 15.0 | 54% | 209 | 35% | 1.62 | 12.7 |
| 13 | 12.9 | 44% | 200 | 41% | 1.65 | 11.0 |
| 14 | 10.4 | 70% | 256 | 64% | 1.78 | 8.0 |
| 15 | 13.5 | 56% | 214 | 47% | 1.54 | 12.5 |
| 16 | 14.8 | 55% | 209 | 46% | 1.70 | 11.8 |
| 17 | 12.4 | 44% | 202 | 43% | 1.61 | 10.3 |
| 18 | 17.2 | 46% | 171 | 48% | 1.55 | 16.2 |
| 19 | 14.6 | 51% | 205 | 36% | 1.63 | 11.9 |
| 20 | 14.7 | 56% | 206 | 46% | 1.63 | 12.3 |
| Average of 20 samples | 13.8 | 51% | 205 | 47% | 1.65 | 11.7 |
| Standard deviation | 2.0 | 8% | 25 | 7% | 0.09 | 2.2 |

Further, the sensory evaluation was performed on the non-fried potato chips of Example 4. As a result, the non-fried potato chips were evaluated as A, because they were crispy and readily melted in the mouth and their texture was almost the same as that of fried potato chips.

Example 5

Non-fried potato chips were produced in the same manner as in Example 1 except that heating with microwaves in a microwave oven with an output power of 500 W and heating with overheated steam performed in the production method employed in Example 1 were both changed to heating with high-temperature and high-velocity airflow, and the heat treatment with high-temperature and high-velocity airflow was performed by adding a large amount of saturated steam to the airflow.

More specifically, oil was sprayed onto potato slices in the same manner as in Example 1, and then the potato slices were heated by blowing high-temperature and high-velocity airflow thereonto for 30 seconds using a high-temperature and high-velocity airflow heat treatment device (THERMOZONE (registered trademark) manufactured by ARAKAWA CO., LTD., fluidized bed (air bed)-type heat treatment device) equipped with a number of thin tube-shaped jet nozzles located above a conveyor while saturated steam was blown into the device at a steam flow rate of 180 kg/h so that the temperature and air velocity of the airflow impinging on the surface of the potato slices were 150° C. and 65 m/s, respectively. After the heating, the potato slices were taken out of the device, and after 10 seconds, the potato slices were again heated by blowing high-temperature and high-velocity airflow thereonto for 30 seconds while saturated steam was blown into the device at a steam flow rate of 180 kg/h so that the temperature and air velocity of the airflow impinging on the surface of the potato slices were 150° C. and 6 m/s, respectively. Then, the potato slices were heated by blowing high-temperature and high-velocity airflow thereonto without introducing steam and then dried at 85° C. in the same manner as in Example 1.

Three of the thus produced non-fried potato chips of Example 5 were arbitrarily selected, and micrographs (30-fold magnification) of their vertical sections taken with the scanning electron microscope are shown in FIG. 5. As can be seen from FIG. 5, the inside of the non-fried potato chips of Example 5 was sufficiently puffed, and a number of pores were present.

Twenty of the non-fried potato chips of Example 5 were arbitrarily selected as samples, and the measurement results of the above-described measurement items 1 to 6 of each of the samples and the average and standard deviation of the measurement results of each of the measurement items 1 to 6 are shown in Table 5.

Further, the sensory evaluation was performed on the non-fried potato chips of Example 5. As a result, the non-fried potato chips were evaluated as A, because they were crispy and readily melted in the mouth and their texture was almost the same as that of fried potato chips.

Comparative Example 1

Commercially-available non-fried potato chips (manufactured by SAPPORO FINE FOODS CO., LTD. under the trade name of "Potekaru") were used as Comparative Example 1. Three of the non-fried potato chips of Comparative Example 1 were arbitrarily selected, and micrographs (30-fold magnification) of their vertical sections taken with the scanning electron microscope are shown in FIG. 6. As can be seen from FIG. 6, the porosity of the inside of the non-fried potato chips of Comparative Example 1 is high, but holes are large and therefore the number of holes is small. Further, the holes were not very uniform in shape and size.

Twenty of the non-fried potato chips of Comparative Example 1 were arbitrarily selected as samples, and the measurement results of the above-described measurement items 1 to 6 of each of the samples and the average and standard deviation of the measurement results of each of the measurement items 1 to 6 are shown in Table 6.

TABLE 5

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 10.7 | 58% | 235 | 58% | 1.63 | 9.3 |
| 2 | 9.8 | 59% | 265 | 45% | 1.77 | 7.8 |
| 3 | 10.3 | 78% | 262 | 71% | 1.74 | 8.5 |
| 4 | 11.4 | 64% | 251 | 46% | 1.70 | 9.1 |
| 5 | 12.5 | 47% | 205 | 47% | 1.54 | 11.9 |
| 6 | 15.2 | 72% | 230 | 48% | 1.72 | 11.5 |
| 7 | 14.4 | 44% | 188 | 42% | 1.57 | 13.7 |
| 8 | 12.4 | 51% | 218 | 40% | 1.53 | 10.9 |
| 9 | 11.1 | 46% | 212 | 48% | 1.54 | 10.0 |
| 10 | 10.8 | 39% | 194 | 54% | 1.54 | 10.5 |
| 11 | 13.6 | 49% | 200 | 45% | 1.59 | 12.4 |
| 12 | 11.2 | 57% | 225 | 61% | 1.76 | 9.0 |
| 13 | 12.1 | 41% | 193 | 45% | 1.52 | 10.9 |
| 14 | 10.2 | 59% | 244 | 54% | 1.70 | 8.6 |
| 15 | 13.6 | 54% | 204 | 58% | 1.70 | 9.8 |
| 16 | 13.1 | 54% | 220 | 39% | 1.68 | 10.2 |
| 17 | 11.0 | 62% | 253 | 46% | 1.58 | 9.5 |
| 18 | 16.4 | 50% | 185 | 46% | 1.55 | 15.5 |
| 19 | 12.7 | 49% | 209 | 46% | 1.65 | 10.6 |
| 20 | 12.1 | 54% | 219 | 56% | 1.74 | 10.4 |
| Average of 20 samples | 12.2 | 54% | 221 | 50% | 1.64 | 10.5 |
| Standard deviation | 1.8 | 10% | 25 | 8% | 0.09 | 1.8 |

TABLE 6

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 2.0 | 74% | 609 | 63% | 2.10 | 1.3 |
| 2 | 2.5 | 91% | 543 | 85% | 1.71 | 2.0 |
| 3 | 1.2 | 78% | 813 | 62% | 1.69 | 0.9 |
| 4 | 4.4 | 73% | 398 | 95% | 2.42 | 1.7 |
| 5 | 3.4 | 70% | 430 | 84% | 2.43 | 1.5 |
| 6 | 7.0 | 64% | 326 | 45% | 1.83 | 4.6 |
| 7 | 1.3 | 83% | 813 | 57% | 1.70 | 1.1 |
| 8 | 2.1 | 66% | 599 | 44% | 1.59 | 1.9 |
| 9 | 4.0 | 73% | 397 | 85% | 2.40 | 2.2 |
| 10 | 2.0 | 67% | 580 | 60% | 2.14 | 0.9 |
| 11 | 4.2 | 86% | 422 | 85% | 2.38 | 2.0 |
| 12 | 12.1 | 45% | 196 | 62% | 1.95 | 7.9 |
| 13 | 1.8 | 83% | 551 | 110% | 1.89 | 1.4 |
| 14 | 5.7 | 58% | 267 | 100% | 1.69 | 4.5 |
| 15 | 3.4 | 73% | 452 | 90% | 2.49 | 1.1 |
| 16 | 2.6 | 70% | 526 | 64% | 2.30 | 1.6 |
| 17 | 1.6 | 76% | 617 | 91% | 3.97 | 0.7 |
| 18 | 3.0 | 77% | 536 | 77% | 2.63 | 1.5 |
| 19 | 2.5 | 90% | 585 | 76% | 2.45 | 1.2 |
| 20 | 2.9 | 69% | 382 | 117% | 1.74 | 2.1 |
| Average of 20 samples | 3.5 | 73% | 502 | 78% | 2.17 | 2.1 |
| Standard deviation | 2.5 | 11% | 158 | 20% | 0.54 | 1.7 |

Further, the sensory evaluation was performed on the non-fried potato chips of Comparative Example 1. As a result, the non-fried potato chips were evaluated as C, because they had a crunchy light texture obviously different from the texture of fried potato chips, that is, different from the desired texture of the non-fried potato chips according to the present invention.

Comparative Example 2

Based on JP-A-2005-245389 listed as Patent Document 6 in the above list of reference documents, non-fried potato chips of Comparative Example 2 were produced in the following manner: potato slices were heated with microwaves, then heated and puffed by blowing high-temperature and high-velocity airflow thereonto without using overheated steam, and then dried by conventional hot-air drying.

More specifically, potatoes (breed: TOYOSHIRO) suitable for potato chips were washed, peeled with a peeler, and cut into slices having a thickness of 1.0 mm to 1.1 mm with a slicer in the same manner as in Example 1.

Twenty grams of the potato slices were heated with microwaves for 150 seconds in a microwave oven with an output power of 500 W to reduce their moisture content to 20%.

After the heating with microwaves, the potato slices were heat-treated to the extent that they did not burn by blowing high-temperature and high-velocity airflow with an air velocity of 60 m/s and a temperature of 200° C. onto the potato slices for 1 minute using a high-temperature and high-velocity airflow heat treatment device (THERMO-ZONE (registered trademark) manufactured by ARAKAWA CO., LTD., fluidized bed (air bed)-type heat treatment device) equipped with a number of thin tube-shaped jet nozzles located above a conveyor.

Then, palm olein oil was sprayed onto the potato slices so that the amount of the oil was 8% by weight.

Finally, the potato slices were subjected to final drying in a hot-air drier at a temperature of 85° C. and an air velocity of 4 m/s for 1 hour until their moisture content was reduced to about 2%. In this way, non-fried potato chips were produced.

Three of the thus produced non-fried potato chips of Comparative Example 2 were arbitrarily selected, and micrographs (30-fold magnification) of their vertical sections taken with the scanning electron microscope are shown in FIG. 7. As can be seen from FIG. 7, the number of holes inside the non-fried potato chips of Comparative Example 2 is small, some of the holes are large in diameter, and the holes show large variations in size.

Twenty of the non-fried potato chips of Comparative Example 2 were arbitrarily selected as samples, and the measurement results of the above-described measurement items 1 to 6 of each of the samples and the averages and standard deviation of the measurement results of each of the measurement items 1 to 6 are shown in Table 7.

TABLE 7

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 4.3 | 60% | 353 | 82% | 2.11 | 2.4 |
| 2 | 5.7 | 39% | 254 | 65% | 1.54 | 5.1 |
| 3 | 1.6 | 88% | 765 | 96% | 2.16 | 1.1 |
| 4 | 7.2 | 60% | 298 | 59% | 1.85 | 4.2 |
| 5 | 7.5 | 42% | 234 | 111% | 2.51 | 3.3 |
| 6 | 4.7 | 54% | 327 | 67% | 1.52 | 4.7 |
| 7 | 5.7 | 66% | 341 | 67% | 1.96 | 3.2 |
| 8 | 5.1 | 65% | 324 | 84% | 1.79 | 3.7 |
| 9 | 6.3 | 66% | 313 | 65% | 1.46 | 6.3 |
| 10 | 8.6 | 42% | 238 | 49% | 2.04 | 6.4 |
| 11 | 6.3 | 55% | 293 | 69% | 2.01 | 3.0 |
| 12 | 4.5 | 56% | 323 | 83% | 2.03 | 3.3 |
| 13 | 8.7 | 54% | 238 | 70% | 1.67 | 7.3 |
| 14 | 5.4 | 65% | 326 | 81% | 2.07 | 3.1 |
| 15 | 4.8 | 71% | 376 | 73% | 2.20 | 2.4 |
| 16 | 5.5 | 48% | 299 | 64% | 1.96 | 3.4 |
| 17 | 7.6 | 46% | 233 | 96% | 1.79 | 6.0 |
| 18 | 4.8 | 76% | 406 | 55% | 2.16 | 3.1 |
| 19 | 10.1 | 43% | 199 | 78% | 1.90 | 6.5 |
| 20 | 2.8 | 64% | 482 | 58% | 1.43 | 2.4 |
| Average of 20 samples | 5.9 | 58% | 331 | 74% | 1.91 | 4.0 |
| Standard deviation | 2.0 | 13% | 122 | 15% | 0.28 | 1.7 |

Further, the sensory evaluation was performed on the non-fried potato chips of Comparative Example 2. As a result, the non-fried potato chips were evaluated as C, because they had a crunchy hard texture obviously different from the texture of fried potato chips.

Comparative Example 3

As described above, Example 5 revealed that the non-fried potato chips according to the present invention can be produced simply by jetting high-temperature and high-velocity airflow as long as a large amount of steam is blown at the same time in the initial stage. Therefore, for the purpose of comparison, non-fried potato chips were produced without blowing steam as a comparative example.

More specifically, potatoes (breed: TOYOSHIRO) suitable for potato chips were washed, peeled with a peeler, and cut into slices having a thickness of 1.0 mm to 1.1 mm with a slicer in the same manner as in Example 5. The potato slices were spread, and palm olein oil was sprayed onto the potato slices in an amount of 2 wt % of the weight of the potato slices.

Then, 100 g of the potato slices were heated by blowing high-temperature and high-velocity airflow thereonto for 30 seconds using a high-temperature and high-velocity airflow heat treatment device (THERMOZONE (registered trademark) manufactured by ARAKAWA CO., LTD., fluidized bed (air bed)-type heat treatment device) equipped with a number of thin tube-shaped jet nozzles located above a conveyor, without blowing steam into the device so that the temperature and air velocity of the airflow impinging on the surface of the potato slices were 150° C. and 65 m/s, respectively.

After the heat treatment with high-temperature and high-velocity airflow was performed without blowing steam, the potato slices were once taken out of the device, and after 10 seconds, the potato slices were again heat-treated by blowing high-temperature and high-velocity airflow thereonto for 30 seconds under the same conditions as described above without blowing steam.

Further, after 20 seconds, the potato slices were again heat-treated without blowing steam to the extent that they did not burn by blowing high-temperature and high-velocity airflow with an air velocity of 60 m/s and a temperature of 200° C. thereonto for 3 minutes with the use of the same device.

Finally, the potato slices were subjected to final drying in a hot-air drier at a temperature of 85° C. and an air velocity of 4 m/s for 1 hour until their moisture content was reduced to 2% or less. In this way, non-fried potato chips were produced.

Three of the thus produced non-fried potato chips of Comparative Example 3 were arbitrarily selected, and micrographs (30-fold magnification) of their vertical sections taken with the scanning electron microscope are shown in FIG. 8. As can be seen from FIG. 8, the number of holes inside the non-fried potato chips of Comparative Example 3 is small, some of the holes are large in diameter, and the holes show large variations in size.

Twenty of the non-fried potato chips of Comparative Example 3 were arbitrarily selected as samples, and the measurement results of the above-described measurement items 1 to 6 of each of the samples and the average and standard deviation of the measurement results of each of the measurement items 1 to 6 are shown in Table 8.

TABLE 8

| Sample No. | Number of holes with short diameter of 20 μm or more [holes/mm²] | Porosity | Average of average diameters of holes [μm] | Coefficient of variation of average diameters of holes (standard deviation/average diameter) | Average of values of long diameter/short diameter | Number of holes whose value of long diameter/short diameter = 2 or less [holes/mm²] |
|---|---|---|---|---|---|---|
| 1 | 3.4 | 87% | 532 | 50% | 1.65 | 3.1 |
| 2 | 5.4 | 50% | 330 | 42% | 1.58 | 4.6 |
| 3 | 4.6 | 40% | 303 | 55% | 1.66 | 3.9 |
| 4 | 3.6 | 66% | 401 | 76% | 1.69 | 3.2 |
| 5 | 3.2 | 78% | 513 | 90% | 1.87 | 2.6 |
| 6 | 1.8 | 69% | 630 | 93% | 2.15 | 1.4 |
| 7 | 3.5 | 70% | 478 | 65% | 2.03 | 2.1 |
| 8 | 10.3 | 56% | 230 | 63% | 1.72 | 8.4 |
| 9 | 5.3 | 50% | 277 | 84% | 1.45 | 4.6 |
| 10 | 9.2 | 44% | 218 | 65% | 1.69 | 7.3 |
| 11 | 3.9 | 74% | 442 | 59% | 1.47 | 3.5 |
| 12 | 4.8 | 71% | 352 | 91% | 1.68 | 3.4 |
| 13 | 9.8 | 41% | 212 | 52% | 1.58 | 8.3 |
| 14 | 7.1 | 56% | 286 | 50% | 1.33 | 7.1 |
| 15 | 4.0 | 69% | 413 | 65% | 1.74 | 2.4 |
| 16 | 9.3 | 59% | 250 | 66% | 1.54 | 8.5 |
| 17 | 9.3 | 43% | 212 | 70% | 1.75 | 8.1 |
| 18 | 5.1 | 59% | 360 | 48% | 1.76 | 3.7 |
| 19 | 5.6 | 56% | 334 | 46% | 1.63 | 5.2 |
| 20 | 0.9 | 78% | 1063 | 53% | 2.14 | 0.3 |
| Average of 20 samples | 5.5 | 61% | 392 | 64% | 1.71 | 4.6 |
| Standard deviation | 2.8 | 14% | 197 | 16% | 0.21 | 2.5 |

Further, the sensory evaluation was performed on the non-fried potato chips of Comparative Example 3. As a result, the non-fried potato chips were evaluated as C, because they had a crunchy hard texture obviously different from the texture of fried potato chips.

<Consideration of Measurement Results>

The measurement results of each of the measurement items of the above-described non-fried potato chips of Examples 1 to 5 and Comparative Examples 1 to 3 are shown in Tables 9 and 10.

TABLE 9

|  | Example 1 | Example 2 | Example 3 | Example 4 | Example 5 |
|---|---|---|---|---|---|
| Number of holes with short diameter of 20 μm or more [holes/mm²] | 13.1 | 15.9 | 13.7 | 13.8 | 12.2 |
| Porosity | 51% | 53% | 56% | 51% | 54% |
| Average of average diameters (averages of long diameter and short diameter) of holes | 214 μm | 195 μm | 214 μm | 205 μm | 221 μm |
| Coefficient of variation of average diameters of holes (standard deviation/average diameter) | 45% | 46% | 46% | 47% | 50% |
| Average of values of long diameter/short diameter of holes | 1.75 | 1.65 | 1.65 | 1.65 | 1.64 |
| Number of holes whose value of long diameter/short diameter = 2 or less [holes/mm²] | 10.5 | 13.5 | 11.5 | 11.7 | 10.5 |
| Sensory test evaluation | A | A | A | A | A |

TABLE 10

|  | Comparative Example 1 | Comparative Example 2 | Comparative Example 5 |
|---|---|---|---|
| Number of holes with short diameter of 20 μm or more [holes/mm$^2$] | 3.5 | 5.9 | 5.5 |
| Porosity | 73% | 58% | 61% |
| Average of average diameters (averages of long diameter and short diameter) of holes | 502 μm | 331 μm | 392 μm |
| Coefficient of variation of average diameters of holes (standard deviation/average diameter) | 78% | 74% | 64% |
| Average of values of long diameter/short diameter of holes | 2.17 | 1.91 | 1.71 |
| Number of holes whose value of long diameter/short diameter = 2 or less [holes/mm$^2$] | 2.1 | 4.0 | 4.6 |
| Sensory test evaluation | C | C | C |

1. Number of Holes with Short Diameter of 20 μm or More and Porosity

As a result of observation of the vertical sections of the non-fried potato chips of Examples 1 to 5, the numbers of holes with a short diameter of 20 μm or more of the non-fried potato chips of Examples 1 to 5 were 13.1/mm$^2$, 15.9/mm$^2$, 13.7/mm$^2$, 13.8/mm$^2$, and 12.2/mm$^2$, respectively, which were all 10/mm$^2$ or more. The porosities of the non-fried potato chips of Examples 1 to 5 were 51%, 53%, 56%, 51%, and 54%, respectively, which were in the range of 35% to 65%. On the other hand, as a result of observation of the vertical sections of the non-fried potato chips of Comparative Examples 1, 2, and 3, the numbers of holes with a short diameter of 20 μm or more of the non-fried potato chips of Comparative Examples 1, 2, and 3 were 3.5/mm$^2$, 5.9/mm$^2$, and 5.5/mm$^2$, respectively, which were far below 10/mm$^2$. That is, the non-fried potato chips of Comparative Examples did not satisfy the requirement that the number of holes with a short diameter of 20 μm or more should be 10/mm$^2$ or more and the porosity should be 35% to 65%. Particularly, the non-fried potato chips of Comparative Examples 2 and 3 had a porosity in the range of 35% to 65%, but their numbers of holes with a short diameter of 20 μm or more were 5.9/mm$^2$ and 5.5/mm$^2$, respectively, which were far below 10/mm$^2$. Therefore, as a result of the sensory test, all the non-fried potato chips of Examples 1 to 5 were crispy and readily melted in the mouth, and their texture was almost the same as that of fried potato chips. On the other hand, the non-fried potato chips of Comparative Examples 1, 2, and 3 were evaluated as C by the sensory test, that is, their texture was obviously different from that of fried potato chips. From the result, it was considered that it is important that non-fried potato chips have a number of holes with a short diameter of 20 μm or more observed in their vertical section of 10/mm$^2$ or more and a porosity of 35% to 65% to allow the non-fried potato chips to be crispy, readily meltable in the mouth, and have the same texture as fried potato chips.

2. Average of Average Diameters of Holes with Short Diameter of 20 μm or More

The averages of average diameters of holes observed in the vertical sections of the non-fried potato chips of Examples 1 to 5 were 214 μm, 195 μm, 214 μm, 205 μm, and 221 μm, respectively, which were 300 μm or less. On the other hand, the averages of average diameters of holes of the non-fried potato chips of Comparative Examples 1, 2, and 3 were as large as 502 μm, 331 μm, and 392 μm, respectively, which were 300 μm or more. This revealed that the average of average diameters of holes with a short diameter of 20 μm or more observed in the vertical sections of the non-fried potato chips of each of Examples 1 to 5 was 300 μm or less and smaller than those of Comparative Examples.

3. Coefficient of Variation in Average Diameters of Holes with Short Diameter of 20 μm or More The coefficients of variation in the average diameters of holes with a short diameter of 20 μm or more observed in the vertical sections of the non-fried potato chips of Examples 1 to 5 (standard deviation/average diameter) were 45%, 46%, 46%, 47%, and 50%, respectively, which were all 55% or less. That is, the holes with a short diameter of 20 μm or more showed relatively small variations in their average diameter and were uniform. On the other hand, the coefficients of variation in the average diameters of holes with a short diameter of 20 μm or more observed in the vertical sections of the non-fried potato chips of Comparative Examples 1, 2, and 3 were 78%, 74%, and 64%, respectively, which were far above 55%. That is, the holes with a short diameter of 20 μm or more of the non-fried potato chips of Comparative Examples showed large variations in their average diameter and were not uniform. This revealed that the non-fried potato chips of each of Examples 1 to 5 had a low coefficient of variation in the average diameters of holes with a short diameter of 20 μm or more observed in their vertical sections of 55% or less, that is, the holes with a short diameter of 20 μm or more showed relatively small variations in their average diameter and were uniform.

4. Average of Values of Long Diameter/Short Diameter of Holes with Short Diameter of 20 μm or More The average of values of long diameter/short diameter of holes with a short diameter of 20 μm or more observed in the vertical sections of the non-fried potato chips of Examples 1 to 5 was 2 or less, that is, the holes were not distorted in shape and close to a circle. Further, the numbers of holes observed in the vertical sections of the non-fried potato chips of Examples 1 to 5 and having a short diameter of 20 μm or more and an average of values of long diameter/short diameter of 2 or less were 10.5/mm$^2$ 13.5/mm$^2$, 11.5/mm$^2$, 11.7/mm$^2$, and 10.5/mm$^2$, respectively, which were far above 5/mm$^2$. On the other hand, the numbers of holes observed in the vertical sections of the non-fried potato chips of Comparative Examples 1, 2, and 3 and having a short diameter of 20 μm or more and an average of values of long diameter/short diameter of 2 or less were 2.1/mm$^2$, 4.0/mm$^2$, and 4.6/mm$^2$, respectively, which were below 5/mm$^2$. This revealed that holes with a short diameter of 20 μm or more observed in the vertical sections of the non-fried potato chips of each of Examples 1 to 5 were not distorted in shape and were often close to a circle, and the number of such holes was 5/mm$^2$ or more.

INDUSTRIAL APPLICABILITY

The non-fried potato chips according to the present invention have a crispy texture and high meltability in the mouth, and therefore have a texture comparable to that of fried potato chips. Further, the non-fried potato chips according to the present invention are healthy potato chips because of having low oil and calorie contents.

The invention claimed is:

1. Non-fried potato chips having
a length along a longitudinal direction,
a width perpendicular to the length, and
a thickness;
said potato chips being heated and dried potato slices;
said potato chips comprising interior voids, wherein:
in a sectional cut of the potato chip through its thickness and along its longitudinal direction, the interior voids are exhibited as holes,
each of the holes having, in the plane of the sectional cut,
a longest diameter and
a short diameter orthogonal to the longest diameter, the short diameter is 20 μm or more,
the holes are exhibited in a density of 10 to 20 holes per mm$^2$, and
the potato chips exhibit porosity due to the holes of 35% to 65%; and
wherein an average of values of (the longest diameter+the short diameter)/2 of the holes is 300 μm or less.

2. The non-fried potato chips according to claim 1, wherein a coefficient of variation in the average diameters of the holes (standard deviation/average diameter) is 55% or less.

3. The non-fried potato chips according to claim 1, wherein an average of values of the (longest diameter/the short diameter) of the holes is 2 or less.

4. The non-fried potato chips according to claim 1, wherein the holes whose value of the (longest diameter/the short diameter) is 2 or less are exhibited in a density of 5 holes or more per mm$^2$.

5. The non-fried potato chips according to claim 1, which have an oil content of 25% or less.

* * * * *